US008909039B2

(12) United States Patent
Astigarraga et al.

(10) Patent No.: US 8,909,039 B2
(45) Date of Patent: Dec. 9, 2014

(54) OPTICAL CABLE TESTING AND MANAGEMENT

(71) Applicant: International Business Machines Corporation, Armonk, NY (US)

(72) Inventors: Tara Astigarraga, Rochester, NY (US); Louie A. Dickens, Tucson, AZ (US); Michael E. Starling, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/789,066

(22) Filed: Mar. 7, 2013

(65) Prior Publication Data

US 2014/0255021 A1   Sep. 11, 2014

(51) Int. Cl.
*H04B 10/00* (2013.01)
*H04B 10/07* (2013.01)

(52) U.S. Cl.
CPC ..................................... *H04B 10/07* (2013.01)
USPC ............................. 398/16; 398/25; 356/73.1

(58) Field of Classification Search
CPC . H04B 10/07; H04B 10/0731; H04B 10/0799
USPC ............... 356/73.1; 385/147, 12, 24, 53, 100; 250/227.11, 227.24; 398/16, 20, 21, 25
See application file for complete search history.

(56) References Cited

U.S. PATENT DOCUMENTS

| | | | |
|---|---|---|---|
| 4,632,544 A * | 12/1986 | Form | 356/73.1 |
| 5,532,603 A * | 7/1996 | Bottman | 324/628 |
| 5,940,559 A * | 8/1999 | Noll | 385/53 |
| 6,373,562 B1 * | 4/2002 | Marsh et al. | 356/73.1 |
| 6,412,987 B1 | 7/2002 | Horwitz et al. | |
| 7,270,442 B2 * | 9/2007 | Davenport et al. | 362/276 |
| 7,271,596 B2 * | 9/2007 | Furse et al. | 324/533 |
| 7,332,728 B2 * | 2/2008 | Beinhocker | 250/474.1 |
| 8,194,239 B2 * | 6/2012 | Harres | 356/73.1 |
| 2003/0164939 A1 * | 9/2003 | Esmaeili | 356/73.1 |

(Continued)

FOREIGN PATENT DOCUMENTS

| | | |
|---|---|---|
| DE | 102011054047 A1 | 3/2012 |
| JP | 04036648 A | 2/1992 |
| WO | WO 2005024372 A1 * | 3/2005 |

OTHER PUBLICATIONS

357010, RD, A, Jan. 10, 1994, Anonymous.

(Continued)

*Primary Examiner* — Sang Nguyen
(74) *Attorney, Agent, or Firm* — Scott A. Berger; Jennifer M. Anda (57) ABSTRACT

A method and apparatus for testing an optical cable is provided. In one embodiment, the apparatus may include a receiver for receiving a received pulse train through the optical cable. The apparatus may further include a cross-correlation system in communication with the receiver. The cross-correlation system may be adapted to determine a cross-correlation of the received pulse train and matched filter to an expected pulse train. The apparatus may further include a comparator in communication with the cross-correlation system. The comparator may be adapted to compare the cross-correlation to a threshold. The apparatus may also include an output transmitter, in communication with the comparator. The output transmitter may be able to output a comparison-result output that includes the results of the comparator comparison of the cross-correlation against a threshold.

20 Claims, 6 Drawing Sheets

(56) References Cited

U.S. PATENT DOCUMENTS

| | | |
|---|---|---|
| 2004/0218175 A1 | 11/2004 | Barkhoudarian et al. |
| 2010/0019134 A1 | 1/2010 | Tsukamoto et al. |
| 2012/0016618 A1* | 1/2012 | Astigarraga et al. .......... 702/109 |
| 2012/0075633 A1 | 3/2012 | Xia et al. |

OTHER PUBLICATIONS

Rai et al., "Parametric study of a fiber-optic laser-induced breakdown spectroscopy probe for analysis of aluminum alloys", Spectrochimica Acta Part B 56 (2001) 2371-2383, © 2001 Elsevier Science B.V. Received Apr. 27, 2001, Accepted Jul. 30, 2001.

SFF Committee, "SFF-8472 Diagnostic Monitoring Interface for Optical Transceivers" SFF Committee, Rev 11.0, Sep. 14, 2010.

Thomes, Jr. et al., "Fiber Optic Cables for Transmission of High-Power Laser Pulses in Spaceflight Applications", International Conference on Space Optics (ICSO) 2010, Oct. 4-8, 2010, Rhodes, Greece.

* cited by examiner

FIRST EQUATION 301

$$CC(t) = \int rpt(\xi)\, ept(\xi-t)\, d\xi$$

FIG. 3A

SECOND EQUATION 302

$$ACept(t) = \int ept(\xi)\, ept(\xi-t)\, d\xi$$

THIRD EQUATION 303

$$ACrpt(t) = \int rpt(\xi)\, rpt(\xi-t)\, d\xi$$

FIG. 3B

FOURTH EQUATION 304

$$\text{Difference}(t) = 1 - CC(t)/[\sqrt{ACept(t)}\sqrt{ACrpt(t)}]$$

OPTICAL CABLE TESTING AND MANAGEMENT

TECHNICAL FIELD

Embodiments described herein generally relate to optical cables, and more specifically, to testing and management of optical cables for signal quality.

BACKGROUND

Electronic connectors may be used to assist in connecting and routing electronic transmissions into individual devices or vast networks. Electronic connectors may be used with electronic cables so that communication can occur between two or more devices. The use of electronic cables may allow for the communication between two or more devices across a great distance. The use of electronic cables may also allow for the creation of a network that may carry or transmit a multitude of signals to a variety of senders and receivers of such signals. For example, the use of a network cable and connector allows the signal being transmitted over the network cable to be routed through larger network systems that the connector may enable the network cable to interface with.

SUMMARY

A method and apparatus for testing an optical cable is provided. In an embodiment, a method may include expecting an expected pulse train through the optical cable. The method may further include receiving a received pulse train through the optical cable. The method may further include determining a cross-correlation of the received pulse train and a matched filter to the expected pulse train. The method may further include comparing the cross-correlation to a threshold value. The method may also include creating a comparison-result output that includes the result of the comparison of the cross-correlation to the threshold value.

In an embodiment, the apparatus may include a receiver for receiving a received pulse train through the optical cable. The apparatus may further include a cross-correlation system in communication with the receiver. The cross-correlation system may be adapted to determine a cross-correlation of the received pulse train and matched filter to an expected pulse train. The apparatus may further include a comparator in communication with the cross-correlation system. The comparator may be adapted to compare the cross-correlation to a threshold. The apparatus may also include an output transmitter, in communication with the comparator. The output transmitter may be able to output a comparison-result output that includes the results of the comparator comparison of the cross-correlation against a threshold.

BRIEF DESCRIPTION OF THE DRAWINGS

In the Figures and the Detailed Description, like numbers refer to like elements.

DETAILED DESCRIPTION

Often electronic devices are designed to communicate with other electronic devices. The communication between such devices may be accomplished by transmitting signals through cables. A common cable type used for communication using signal transmission is the optical cable. Optical cables allow for a signal made of light to be sent through them. In various embodiments, optical cables may consist of one or more optical fibers for the transmission of the light signal. Such cable and fibers are sometimes referred to as fiber optic. In some embodiments, a single optical cable may contain up to a thousand optical fibers and may have a potential bandwidth in the terabytes per second. In other embodiments, optical cables that do not use optical fiber may be used.

Optical fiber consists of a core and a cladding layer, selected for total internal reflection due to the difference in the refractive index between the two. In optical fibers, the cladding is usually coated with a layer of acrylate polymer or polyimide. This coating may protect the fiber from damage but may not contribute to its optical waveguide properties. Individual coated fibers, fibers formed into ribbons, or fiber bundles may then have a tough resin buffer layer or core tube(s) extruded around them to form the cable core. Several layers of protective sheathing, depending on the application, may be added to form the cable. Rigid fiber assemblies sometimes put light-absorbing ("dark") glass between the fibers, to prevent light that leaks out of one fiber from entering another. This may reduce cross-talk between the fibers, or reduce flare in fiber bundle imaging applications.

Optical fibers may be inherently very strong, but the strength may be reduced by microscopic surface flaws inherent in the manufacturing process. The initial fiber strength, as well as its change with time, must be considered relative to the stress imposed on the fiber during handling, cabling, and installation for a given set of environmental conditions. There can be several factors that may lead to strength degradation, interference, and failure in transmission capabilities in optical cables. For example, a few known causes that may occur are dynamic fatigue, static fatigue, and zero-stress aging. The inconsistency in manufacturing along with possible degradation over time creates a need for testing of optical cable post production as well as throughout a cable's use in the field. The optical cable's transmission properties may also be modified by contaminants such as dirt, oil, or foreign bodies on or within the optical cable. Embodiments of the presented invention may allow for testing of optical cables for performance and signal quality losses. This testing may allow for a determination of quality and suitability of the optical cable for various uses.

Features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments may be practiced and to further enable those of skill in the art to practice the invention. It is also to be understood that the descriptions of the embodiments are provided by way of example only, and are not intended to limit the scope of this invention as claimed.

Figure 1:
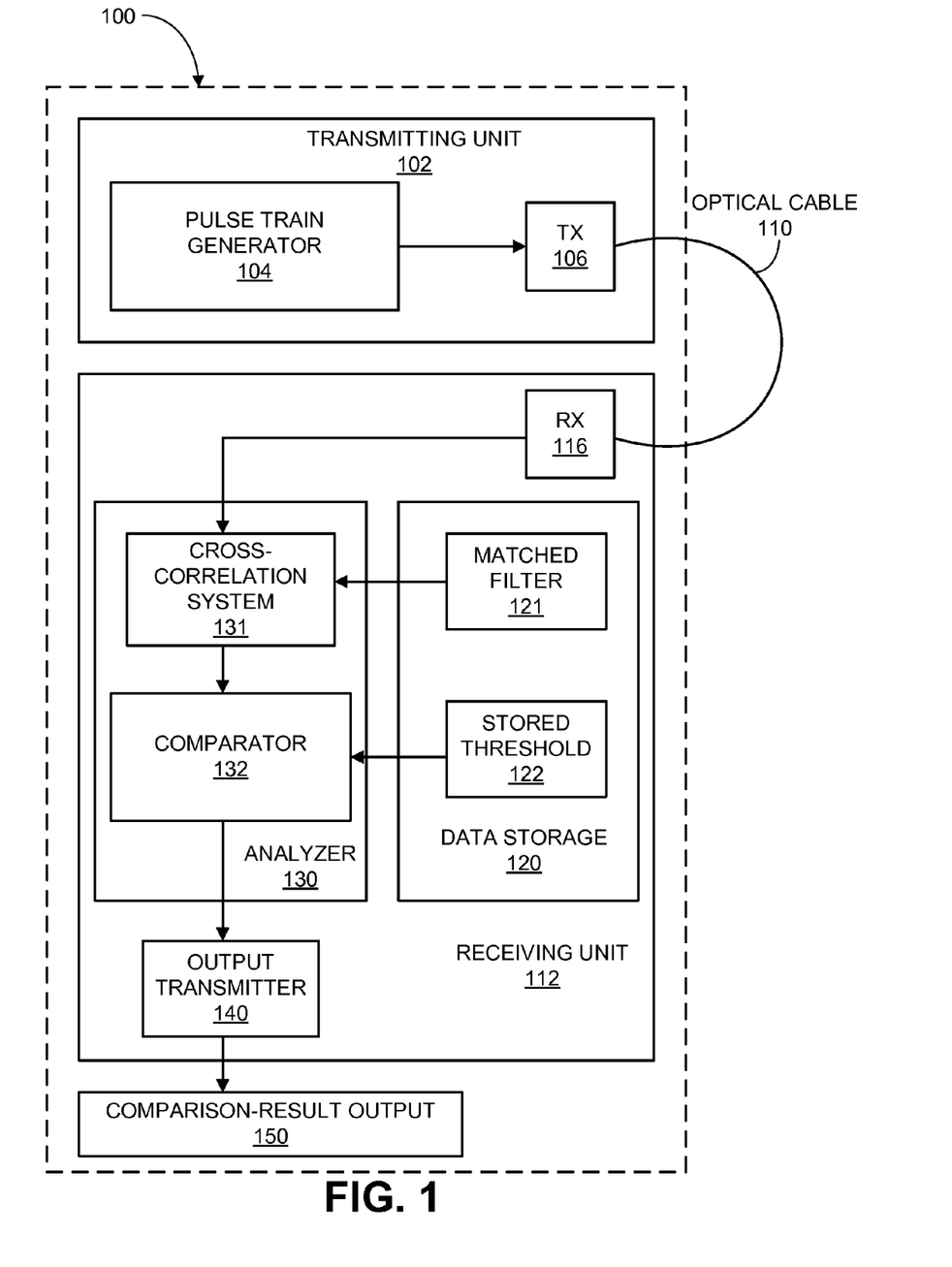
FIG. 1 shows a schematic representation of an apparatus for testing an optical cable, according to an embodiment of the invention.

FIG. 1 is schematic representation of an apparatus 100 for testing the optical cable 110, according to an embodiment of the invention. FIG. 1 shows the apparatus 100 with a transmitting unit 102 and receiving unit 112. In this embodiment, the transmitting unit 102 may include a unit pulse train generator 104 and transmitting connector (TX) 106, to send a unit pulse train signal through an optical cable 110 to the receiving unit 112. A pulse train is a series of regularly recurrent electronic pulses having similar characteristics. In some embodiments, a pulse train may also be known as a pulse group. In this embodiment, the transmitting unit 102 and the receiving unit 112 may be different devices. In other embodiments, the combination of elements shown and described in these devices may be split among several devices or combined into a single device.

In this embodiment, the receiving unit 112 may include a receiving connector (RX) 116, an analyzer 130, data storage 120, and output transmitter 140. The analyzer may contain a cross-correlation system 131 and comparator 132. The data storage 120 may contain matched filter 121 and a stored threshold 122. In various embodiments, the analyzer 130 and data storage 120 may be part of one or more computer systems. In other embodiments, the analyzer 130, cross-correlation system 131, or comparator 132 may be electronic equipment capable of performing the required task. In the shown embodiment, the cross-correlation system 131 and comparator 132 are shown as part of the same analyzer 130. In other embodiments, the cross-correlation system 131 and the comparator 132 may be separate entities, and either may be remote of the receiving unit 112. In the shown embodiment, the matched filter 121 and stored threshold 122 are shown as part of a single data storage unit. In other embodiments, the matched filter 121 and stored threshold 122 may be separate entities, and either may be remote of the receiving unit 112.

The data storage 120 may be any form of storage usable by either the cross-correlation system 131 or the comparator 132. In one example, the analyzer 130 may be a computer system, with the cross-correlation system 131 and the comparator 132 being programs running on the computer system. In this embodiment, the data storage 120 may be computer memory. For example, the computer memory may be Static Random Access Memory (SRAM), Dynamic Random Access Memory (DRAM), read-only memory (ROM), or flash memory. In another embodiment, the data storage 120 may also be representative of a non-volatile memory, such as a hard disk drive, solid state device (SSD), or removable memory cards, optical storage, flash memory devices, network attached storage (NAS), or connections to storage area network (SAN) devices, or to a data cloud, or other devices that may store non-volatile data.

The output transmitter 140 may output the result of the comparator 132 as part of the comparison-result output 150. In various embodiments, the comparison-result output 150 may vary from a simple electronic output to a detailed electronic communication. In one example of a simple electronic output, the comparison-result output 150 from the output transmitter 140 may be an electrical current that powers a green pass light or a red fail light. In an example of a detailed electronic communication, the comparison-result output 150 from the output transmitter 140 may be a detailed message on the results of the comparator 132 via the internet or cellular network to an electronic device. For example, an e-mail may be part of the output transmission. In various embodiments, this message, or e-mail, may contain information on replacement product availability and ordering for a failure result. In another example, this may be accomplished by transmitting a matrix barcode as part of the output transmission.

The comparison-result output 150 shows the result of the cross-correlation system 131 and comparator 132 in the example analyzer 130 of the receiving unit 112. The cross-correlation system 131 and comparator 132 are used to analyze a pulse train sent through the optical cable 110 by the transmitting unit 102. The pulse train generator 104 creates and transmits a known pulse train through the optical cable 110 to the receiving unit 112. The expected pulse train generated and transmitted by the transmitting unit 102 may match an expected train stored in the matched filter 121 of the data storage 120 when it is initially transmitted. After transmission through the optical cable 110 the expected pulse train may be transformed, altered, or degraded into a received pulse train by the time it is received by the receiving unit 112. The change in the pulse train from the expected pulse train to the received pulse train may be a result of interference, failure, or degradation in an optical cable 110. It is this change in the pulse train that is measured to determine the viability of the optical cable. In a perfect optical cable the expected pulse train and the received pulse train may be equivalent.

In the shown embodiment, when the pulse train is received at the receiving unit 112 the cross-correlation system 131 may be used to analyze the received pulse train with respect to the matched filter 121. The matched filter 121 may represent the expected pulse train that the receiving unit 112 may receive if there are no effects to the pulse train sent by the transmitting unit 102 by transmittal over the optical cable 110. This may effectively analyze the received pulse train with respect to the sent expected pulse train. In various embodiments, the cross-correlation system 131 may determine the difference between the two pulse trains using a convolution. The difference between the received pulse train and the matched filter may be reduced to a convolution integral. In various embodiments, this convolution integral may be used to create a value used as a cross-correlation. This is described in more detail during discussion of FIG. 3A-3C.

In the presented embodiment, the cross-correlation created by cross-correlation system 131 may be compared to a stored threshold value 122 by the comparator 132. From this comparison, the comparator 132 may generate a pass or fail result. This result generated by the comparator may be sent to the output transmitter 140. The output transmitter 140 may transmit the comparison-result output 150 as previously discussed.

In various embodiments, comparison-result outputs 150 that contain additional information, such as replacement order information, may have such information created or added by elements such as the comparator 132, analyzer 130, output transmitter 140, receiving unit 112, or a system accessible to the receiving unit 112 for providing and adding the information to the comparison-result output 150.

In various embodiments, the cross-correlation value may be compared to multiple stored thresholds by the comparator 132. In such embodiments, the comparison-result output 150 may include the viability of the optical cable 110 for several uses or transmission types. For example, the cross-correlation may be compared to a first stored threshold value for time sensitive uses, such as updating stock prices, where errors or delays need to be limited. The cross-correlation value may also be compared to a second stored threshold value for general use, such as e-mail transmission, where errors or delays may be more easily handled. In this example, the comparison-result output 150 may signify that an optical cable 110 is viable for both uses, just one use, or neither use. In another embodiment, the stored threshold value 122 may differ for manufacturing-testing versus user-testing in the field. This may be done, for example, to ensure that the cable is functional when it leaves manufacturing and arrives for usage.

Figure 2A:
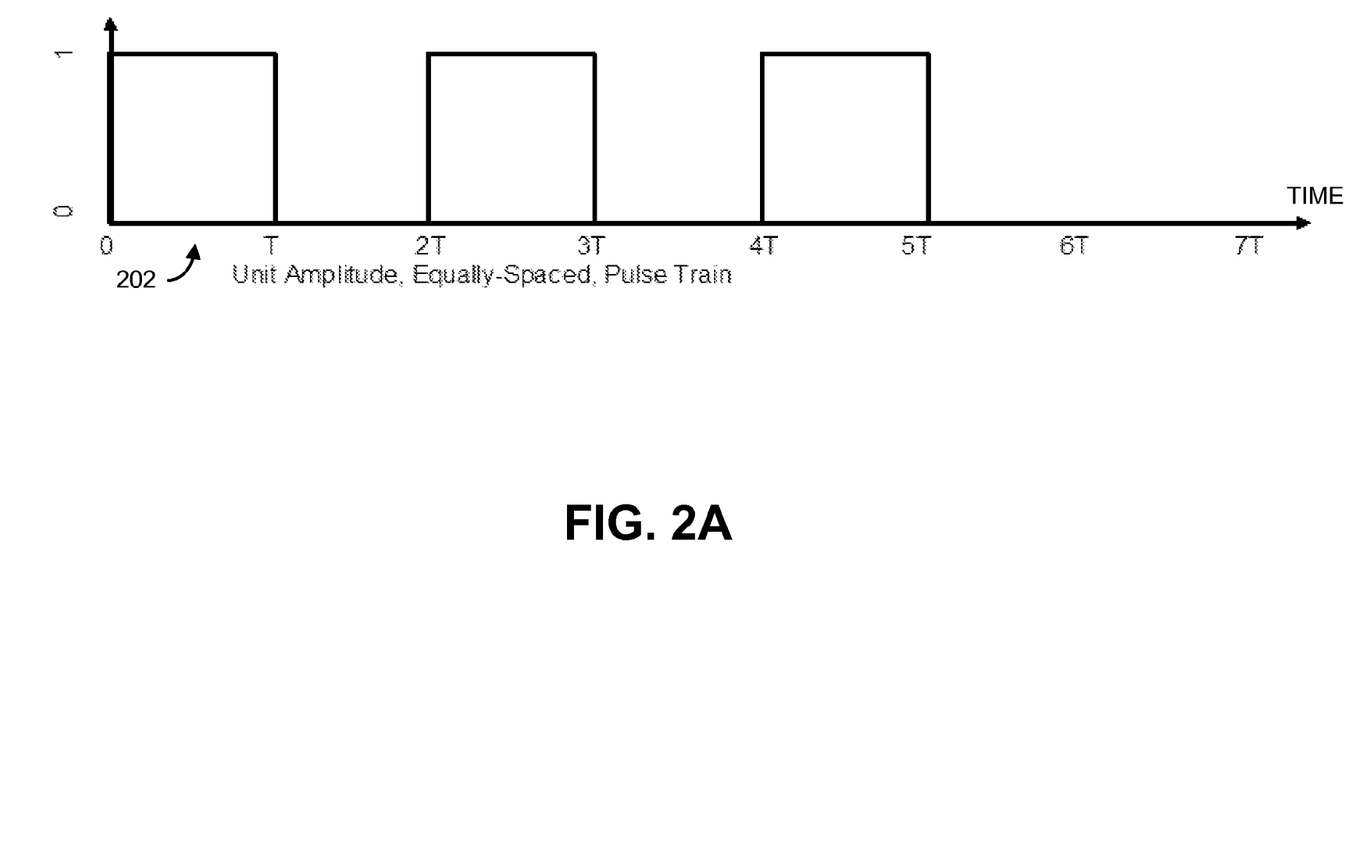
FIG. 2A shows a diagram of a unit amplitude, equally spaced, pulse train, according to an embodiment of the invention.
Figure 2B:
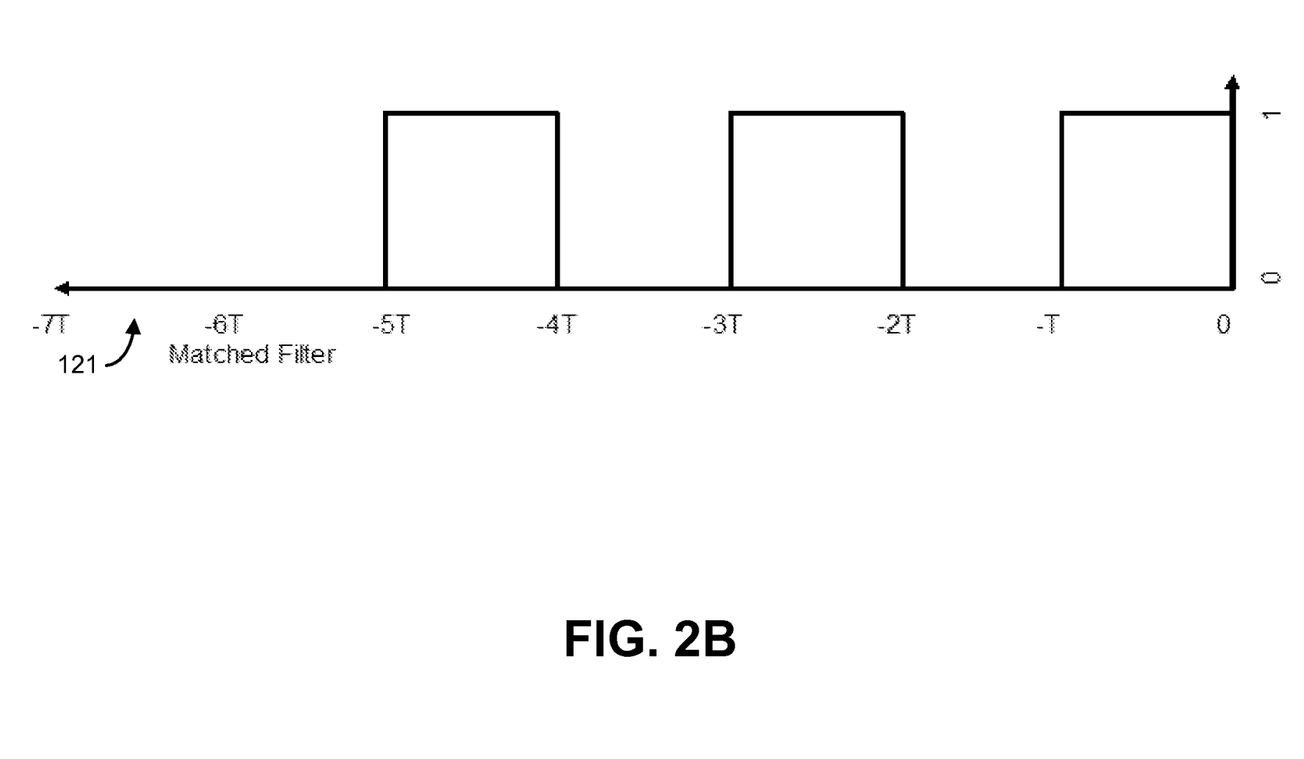
FIG. 2B shows a matched filter for the pulse train of FIG. 2A, according to an embodiment of the invention.
Figure 2C:
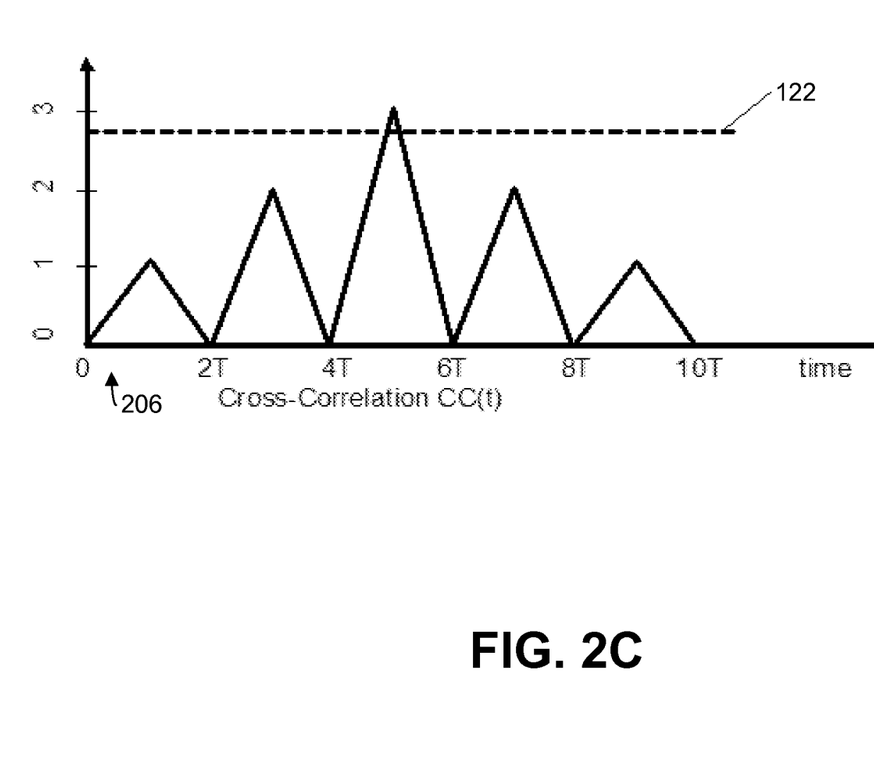
FIG. 2C shows the cross-correlation of the pulse train of FIG. 2A and the matched filter of FIG. 2B, according to an embodiment of the invention.
Figure 3A:
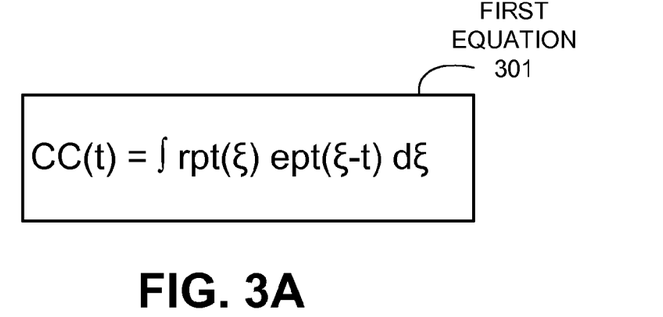
FIG. 3A shows a first equation used in determining a cross-correlation, according to an embodiment of the invention.
Figure 3B:
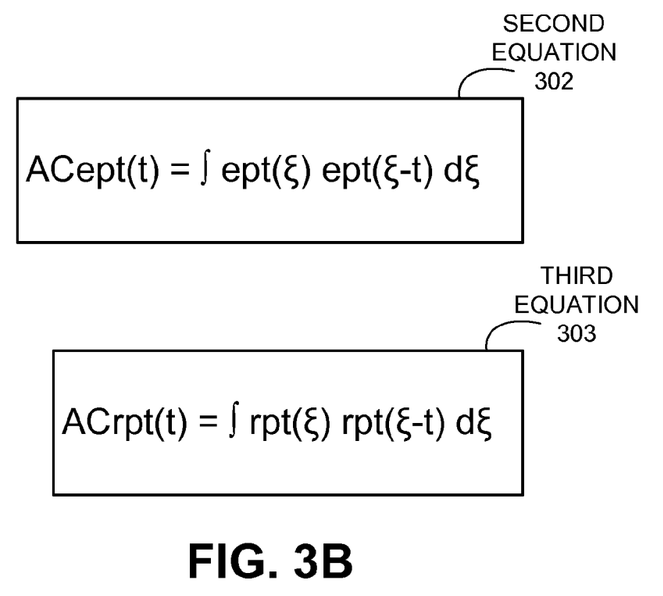
FIG. 3B shows second and third equations used in determining auto-correlations, according to an embodiment of the invention.
Figure 3C:
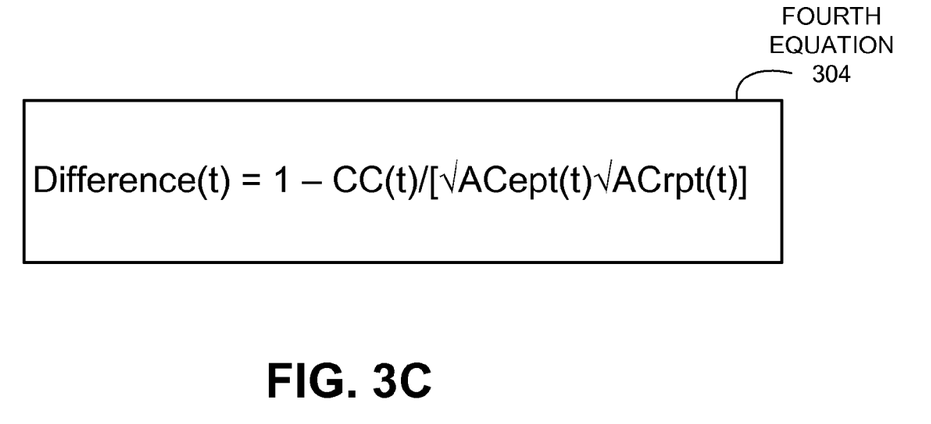
FIG. 3C shows fourth equation used in determining a difference between unity and the cross-correlation normalized by autocorrelations, according to an embodiment of the invention.

FIGS. 2A-2C are an embodiment of a pulse train which may be used for cross-correlations in accordance with the invention. FIG. 2A is an embodiment of an example pulse train 202. FIG. 2B is an embodiment of an example matched filter 121 for example pulse train 202. FIG. 2C is an embodiment of an example cross-correlation result 206. These may be evaluated using the calculations from FIG. 3A-3C as described below. FIG. 3A-3B detail calculations for determining cross-correlation and auto-correlations, respectively. FIG. 3C details a difference equation which compares the cross-correlation normalized with auto correlations against unity (100%).

In one embodiment, a cross-correlation may be determined between the pulse train 202 of FIG. 2A and matched filter 121 of FIG. 2B by using the calculation 301 of FIG. 3A. In the example, the pulse train 202 is a unit amplitude, equally-spaced, pulse train. It is contemplated that, a variety of pulse trains may possibly be used and be within the scope of the invention.

In the example, pulse train 202 may be represented by the value rpt(t). The matched filter 121 may be seen as the impulse response of the expected pulse train and represented by the equation h(t)=ept(−t). A cross-correlation may be determined using these in conjunction with the first equation 301 in FIG. 3A which includes an integral over time t. In the example, the ξ may be the integration variable along the time axis. Also, the pulse train 202 of FIG. 2A may be depicted as having N=3 equally spaced, and equal duration pulses of unit amplitude. This may result in impulse response h(t)=ept(−t) of matched filter 121 also having N=3 equally spaced, and equal duration of time T, pulses of unit amplitude. This may also result in the cross-correlation CC(t) 206 of FIG. 2C having (2N−1)=5 triangular peaks, where the amplitude of the triangular peaks vary to a maximum value of 3.

In this example, the goal is to have cross-correlation CC(t) 206 exceed stored threshold 122. If threshold 122 is exceeded, the optical cable 110 may be deemed usable, and if not, then the optical cable 110 may fail the test. If threshold 122 is exceeded, the closer the received pulse train is to what was expected. This may represent that the optical cable 110 is viable for the use defined by the stored threshold 122.

In alternate embodiments, the correlation may be further refined by dividing the cross correlation 206 by the autocorrelation. Autocorrelation ACept(t) between the expected pulse train ept(t) and itself is calculated as shown in second equation 302 of FIG. 3B. Similarly, the autocorrelation ACrpt(t) between the received pulse train rpt(t) and itself may be calculated as shown in third equation 303 of FIG. 3B. In these embodiments, the range of the ratio of CC(t)/[√ACept(t)√ACrpt(t)] for each time t may be between −1 and +1, where +1 represents the ideal correlation of one hundred percent (100%).

In an alternate embodiment, the goal is to have Difference (t) less than a stored threshold 122 to indicate that the received pulse train is what was expected, meaning that the smaller the difference, the closer the received pulse train is to what was expected and that the optical cable 110 is suitable for use. To maximize CC(t)/[√ACept(t)√ACrpt(t)], the following difference surface, Difference(t), is defined in fourth equation 304 of FIG. 3C. As shown, Difference(t) is calculated by subtracting CC(t)/[√ACept(t)√ACrpt(t)] from unity.

In various embodiments, Difference(t) may be evaluated by a point-to-point evaluation, as an arithmetic mean, as a geometric mean, or as a root-mean-square. Difference(t) ranges between 0 and +2, and the ideal difference for each value of time t is 0, meaning for a value of 0 that there is no difference between the received pulse train rpt(t) and the expected pulse train ept(t) at time t. Difference(t) may be evaluated point-by-point in read difference calculations, but it may be advantageous to quantify Difference(t) in terms of a single number, in order to simplify calculations. Such single numbers may be MAX_Difference which is equal to the maximum value of Difference(t). Alternately AM_Difference, the arithmetic mean of the values of Difference(t), GM_Difference, the geometric mean of the values of Difference(t), or RMS_Difference, the root-mean-square of the values of Difference(t) may be used in the read difference calculations.

Figure 4:
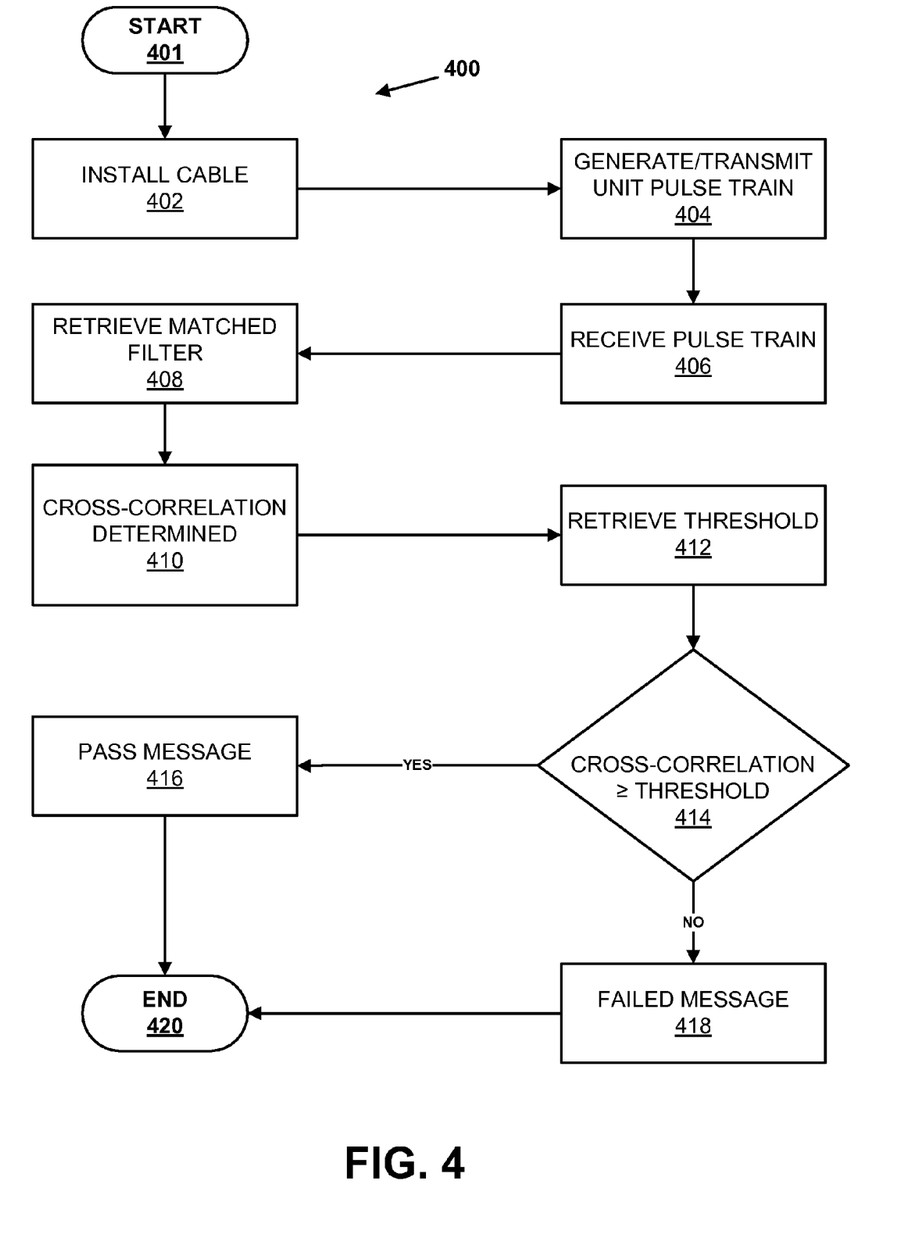
FIG. 4 is a flowchart illustrating a method, according to an embodiment of the invention.

FIG. 4 is a flowchart of a method 400 to test an optical cable 110 using the pulse train generator 104, cross-correlation system 131 with matched filter 121, and comparator 132 with stored threshold 122 as previously discussed. The method 400 starts in block 401 and in block 402 the optical cable 110 may be installed to the transmitting connector 106 and the receiving connector 116.

Once the optical cable 110 is installed the method 400 may proceed to block 404. In the present embodiment, a sent pulse train is generated by the pulse train generator 104 and transmits the pulse train into the optical cable 110 through the transmitter connector 106. After transmittal through the optical cable 110 the sent pulse train is now a received pulse train as it is received at the receiving connector 116 in block 406.

In block 408, the receiving unit 112, having now received the pulse train may retrieve the matched filter 121 from the data storage 120. In the present embodiment, the method 400 may proceed to block 410. In block 410, the cross-correlation system may determine the cross-correlation, FIG. 3A, of the received pulse train and the matched filter 121. In various embodiments, the cross-correlation system may use a convolution in determining the cross-correlation. The cross-correlation and convolution may include the previously discussed examples of the process or other similar cross-correlations and convolutions that are contemplated as within the scope of the invention. The cross-correlation system may also utilize auto-correlations, FIG. 3B, and difference equation, FIG. 3C.

In the present embodiment, the method 400 may proceed to block 412 where the stored threshold 122 may be retrieved. In other embodiments, the stored threshold 122 may be retrieved prior to the convolution of block 410. In various embodiments, the stored threshold 122 may be retrieved at the same time as the retrieval of the matched filter 121. Once the cross-correlation of block 410 is determined and the stored threshold 122 is retrieved in block 412 the method 400 may proceed to block 414. In the presented embodiment, block 414 may include the comparison of the cross-correlation from the convolution system 131 to the stored threshold 412.

In the present embodiment, if the cross-correlation value is equal to or greater than the stored threshold 122 a pass message may be part of the comparison-result output 150 sent by the output transmitter 140 in block 416. The method 400 may then end at block 420. Returning to block 414, if, instead, the cross-correlation value is less than the stored threshold 122 a fail message may be part of the comparison-result output 150 sent by the output transmitter 140 in block 418. The method 400 may then end at block 420. Other embodiments may perform fewer steps, more steps, or different steps than those shown by example method 400.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions which execute via the processor of the computer or other programmable data processing apparatus, create means for implementing the functions/acts specified in the flowchart and/or block diagram block or blocks.

These computer program instructions may also be stored in a computer readable medium that can direct a computer, programmable data processing apparatus, or other device to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or device to cause a series of operational steps to be performed on the computer, other programmable apparatus or device, to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for testing an optical cable performed by an analyzer, comprising:
    expecting an expected pulse train through the optical cable;
    receiving a received pulse train through the optical cable;
    determining, using a convolution, a cross-correlation of the received pulse train and a matched filter to the expected pulse train;
    comparing the cross-correlation to a threshold value, wherein comparing the cross-correlation to a threshold value involves normalizing the cross-correlation with auto-correlations against unity; and
    creating a comparison-result output that includes the result of the comparison of the cross-correlation to the threshold value.

2. The method of claim 1 further comprising, transmitting the expected pulse train through the optical cable by a pulse train generator.

3. The method of claim 1, wherein the comparison-result output includes a matrix barcode.

4. The method of claim 1, wherein the comparison-result output includes one or more optic fibers.

5. The method of claim 1, wherein the comparison-result output includes a pass or fail result.

6. The method of claim 1, wherein the comparison-result includes an e-mail.

7. The method of claim 1, wherein comparing the cross-correlation to a threshold value involves the use of a convolution integral.

8. An apparatus for testing an optical cable, comprising:
a receiver for receiving a received pulse train through the optical cable;
a cross-correlation system in communication with the receiver, the cross-correlation system adapted to use a convolution to determine a cross-correlation of the received pulse train and matched filter to an expected pulse train;
a comparator in communication with the cross-correlation system, the comparator adapted to compare the cross-correlation to a threshold, wherein the comparator is further adapted to compare the cross-correlation to a threshold value by normalizing the cross-correlation with auto-correlations against unity; and
an output transmitter in communication with the comparator, the output transmitter able to output a comparison-result output that includes the results of the comparison of the cross-correlation to the threshold.

9. The apparatus of claim 8 further comprising, a pulse train generator for transmitting the expected pulse train through the optical cable to the receiver.

10. The apparatus of claim 9, wherein the pulse train generator is part of a first element and the receiver and cross-correlation system are part of a second element.

11. The apparatus of claim 10, wherein the first and second element have a second communication channel.

12. The apparatus of claim 8, wherein the comparison-result output includes a matrix barcode.

13. The apparatus of claim 8, wherein the optical cable includes one or more optic fibers.

14. The apparatus of claim 8, wherein the comparison of the cross-correlation to the threshold value includes a pass or fail result.

15. The apparatus of claim 8, wherein the comparison-result output includes the transmitting of an e-mail.

16. The apparatus of claim 8, further comprising:
a data storage containing the matched filter accessible to the cross-correlation system.

17. The apparatus of claim 8, further comprising:
a data storage containing the threshold accessible to the comparator.

18. The apparatus of claim 8, wherein the comparator utilizes a convolution integral.

19. A non-transitory computer-readable storage medium read by a computer encoded with instructions to cause a machine to test an optical cable, the instructions when executed comprising:
expecting an expected pulse train through the optical cable;
receiving a received pulse train through the optical cable;
determining using a convolution a cross-correlation of the received pulse train and a matched filter to the expected pulse train;
comparing the cross-correlation to a threshold value, wherein comparing the cross-correlation to a threshold value involves normalizing the cross-correlation with auto-correlations against unity; and
creating a comparison-result output that includes the result of the comparison of the cross-correlation to the threshold value.

20. The non-transitory computer-readable storage medium read by a computer of claim 19, the instructions when executed further comprising: transmitting the expected pulse train through the optical cable by a pulse train generator.

* * * * *